(12) United States Patent
Carpenter

(10) Patent No.: US 8,570,614 B2
(45) Date of Patent: Oct. 29, 2013

(54) DETERMINING MAINTENANCE CONDITIONS IN A DOCUMENT SCANNER

(75) Inventor: Michael D. Carpenter, Arlington, TX (US)

(73) Assignee: Siemens Industry, Inc., Alpharetta, GA (US)

(*) Notice: Subject to any disclaimer, the term of this patent is extended or adjusted under 35 U.S.C. 154(b) by 212 days.

(21) Appl. No.: 13/050,307

(22) Filed: Mar. 17, 2011

(65) Prior Publication Data

US 2011/0228352 A1 Sep. 22, 2011

Related U.S. Application Data

(60) Provisional application No. 61/314,732, filed on Mar. 17, 2010.

(51) Int. Cl.
*G06K 15/00* (2006.01)
*G06F 3/12* (2006.01)
*H04N 1/38* (2006.01)
*G01N 21/00* (2006.01)

(52) U.S. Cl.
USPC ........ 358/474; 358/1.14; 358/1.15; 358/1.16; 358/463; 358/464; 356/237.1; 356/237.2; 356/237.3

(58) Field of Classification Search
USPC ............... 358/474, 496, 464, 497, 498, 471, 358/284, 1.16, 1.1, 1.2, 1.6, 1.18, 1.14, 1.15, 358/463, 296, 537, 538, 540, 401; 382/112, 382/309, 101, 275, 172, 141, 167, 218, 177, 382/176, 199, 93, 255, 284, 165, 290, 173, 382/229; 356/23, 35, 456, 490, 493, 138, 356/607, 608, 614, 433, 444, 229, 81, 239.8, 356/239.7, 237.1, 237.2, 237.3
See application file for complete search history.

(56) References Cited

U.S. PATENT DOCUMENTS

| | | | | |
|---|---|---|---|---|
| 5,864,408 A | * | 1/1999 | Kumashiro | 358/461 |
| 2002/0168090 A1 | * | 11/2002 | Bruce et al. | 382/101 |
| 2005/0179960 A1 | * | 8/2005 | Obana et al. | 358/449 |
| 2005/0238205 A1 | * | 10/2005 | Kimura et al. | 382/112 |

* cited by examiner

*Primary Examiner* — Ngon Nguyen

(57) ABSTRACT

A system and method for processing mail and other documents. A method includes scanning a document to produce a document image and analyzing the document image. The method includes determining that there is a condition of the data processing system that requires maintenance based on the analysis. The method includes notifying at least one user of the condition that requires maintenance based on the determination.

20 Claims, 6 Drawing Sheets

DETERMINING MAINTENANCE CONDITIONS IN A DOCUMENT SCANNER

CROSS-REFERENCE TO OTHER APPLICATION

This application claims the benefit of the filing date of U.S. Provisional Patent Application 61/314,732, filed Mar. 17, 2010, which is hereby incorporated by reference.

TECHNICAL FIELD

The present disclosure is directed, in general, to scanning systems for mail and other items.

BACKGROUND OF THE DISCLOSURE

More efficient and effective systems for scanning mail and other items are desirable.

SUMMARY OF THE DISCLOSURE

Various disclosed embodiments include a system and method for processing mail and other documents. A method includes scanning a document to produce a document image and analyzing the document image. The method includes determining that there is a condition of the data processing system that requires maintenance based on the analysis. The method includes notifying at least one user of the condition that requires maintenance based on the determination. Various embodiments also include a non-transitory computer readable medium having program instructions tangibly stored thereon executable by a processor to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
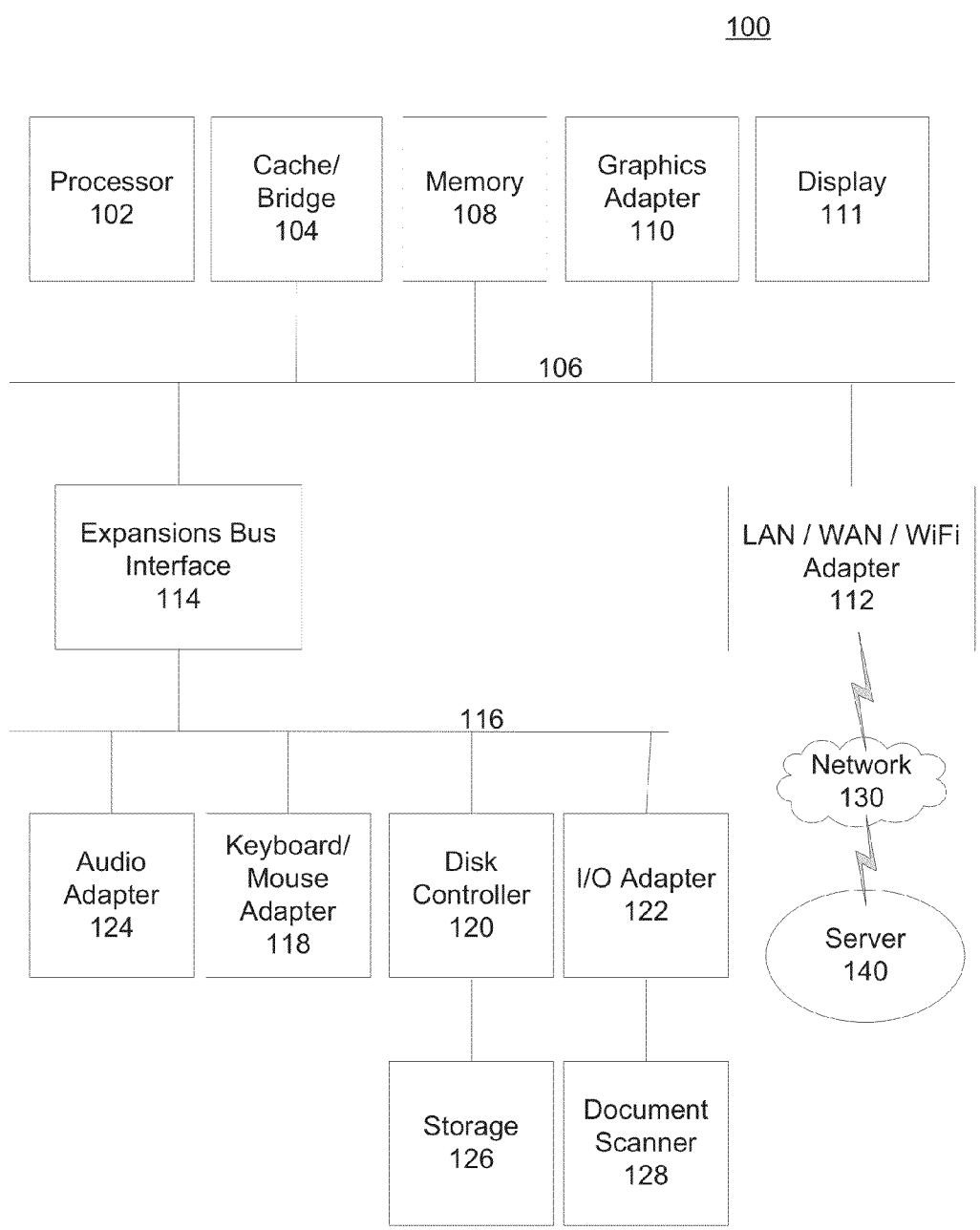
FIG. 1 depicts a block diagram of a data processing system in which an embodiment can be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Postal services rely on automated equipment to accurately sort mail for distribution. Mail is typically sorted according to address information on the surface of the mail item. The information needed to sort and distribute mail is derived from the mail itself by automatic reading systems. These automatic reading systems rely on images scanned from the mail as it is being processed, usually through the use of line-scan sensors, oriented such that a visible portion of mail items pass across a platen at a fixed distance. As the mail item traverses a slot in the platen, reflected line image data is captured on an electronic sensor. The sensor is precisely synchronized with the speed of the mail item as it passes over the surface of the platen.

The nature of mail is such that paper dust, bits of paper, and adhesive labels tend to be deposited on the slot in the platen. In some cases, the slot is covered with transparent glass, in others, it is an open gap. In either case, if the slot is blocked in any way, the image data recorded will be corrupted in the area of the obstruction, which will appear as either a dark or light band across the image. Corruption in the form of distortion may also occur if the mail item changes speed as it passes over the platen, particularly if the line scan sensor cannot be continually synchronized with the speed of the mail item. Distortion due to speed changes is manifested in the image as stretched or squeezed vertical sections of the image.

Image corruption prevents address data and other pertinent information from being derived from the mail item. As a result, affected mail items are processed as exceptions, at significantly reduced productivity. Rapid reaction from maintenance personnel allows the obstruction or the cause for speed variation to be corrected, so that the automated equipment returns to optimal performance, with the highest possible productivity.

One approach to dealing with these issues includes displaying images of mail items periodically on the user interface so that an operator might notice the anomaly and take corrective action, such as stopping the mail processing equipment so that the situation can be corrected. This approach works in the severest manifestations, which are easily discernable one noticed, but more subtle manifestations are difficult to discern and typically go unnoticed. Even relatively subtle manifestations can have a drastic impact on performance and productivity.

Disclosed systems and methods can detect these situations quickly, automatically stop the equipment, and notify maintenance of the situation.

FIG. 1 depicts a block diagram of a data processing system 100 in which an embodiment can be implemented, for example as a mail processing system configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 is connected in some embodiments to a document scanner 128, which in particular can be implemented as a mail scanner as described herein. The particular hardware, including mail or document transporters, lighting, imaging, and the platen, can be implemented as described in more detail below, or using other conventional equipment known to those of skill in the art and so not necessary to be described here.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing network or combination of networks, as known to those of skill in the art, including the Internet. The data processing system 100 can communicate over the network 130 with a server system 140, which is also not part of the data processing system 100, but can be implemented, for example, as a separate data processing system 100.

Disclosed embodiments includes methods and automatic systems for identifying when maintenance is required in line-scan camera systems, such as my be implemented in a system 100, particularly those systems and methods associated with the scanning of flat items such as mail items and other documents.

Figure 2:
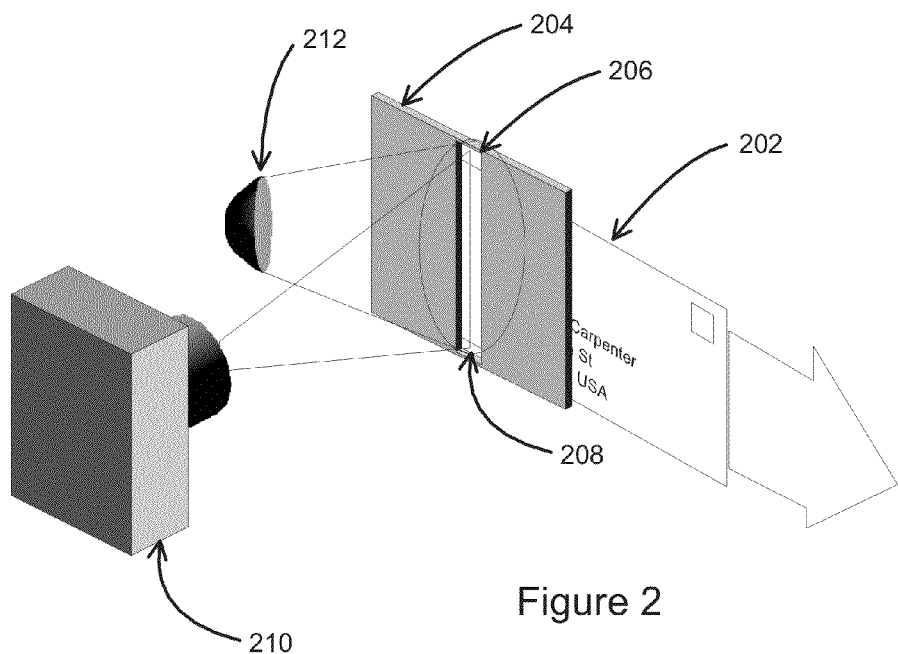
FIG. 2 depicts a document scanner in accordance with disclosed embodiments.

FIG. 2 depicts a document scanner in accordance with disclosed embodiments, which can be used, for example, as document scanner 128. Of course, the systems and methods used herein can also be used with flat-bed or other document scanners.

In this example, a mail item 202 or other document is being scanned as it moves across a platen 204, in the direction of the arrow shown. Of course, the direction of movement could be changed. Platen 204 has an aperture 206 through which a portion of the item 202 is visible as it passes. In various embodiments, aperture 206 includes a transparent pane 208 that can be glass, polycarbonate, or other substantially transparent material.

The document scanner also includes an imager 210, such as a camera, line sensor, or other imager known to those of skill in the art, that is placed and configured to capture images of ("scan") the item 202 as it passes behind (or beneath) aperture 206 and transparent pane 208. The document scanner can also include illumination 212, such as a lamp, LED, or other light source, that is placed to illuminate the portions of item 202 being scanned by the imager 210.

The transparent pane 208, or other pane between the imager 210 and the item 202, that may often be smudged, dirty, or have other problems that prevents the imager 210 from obtaining a clear scan of the item 202 as it passes, and so corrupted images are produced. The same is true if dust, lint, or other obstructions block the aperture 206 or the space between the imager 210 and item 202.

Note that, while not depicted here for purposes of clarity, a document scanner can also have a back surface behind or beneath the platen 204, and the item 202 can move along this back surface. The back surface can be visible through the aperture 206 or pane 208, and can have a distinct visual pattern or a plain surface appearance. The imager 210 can view the back surface between each of the items 202, while they being transported, and can obtain an image of the back surface. In other cases, instead of a back surface, transport mechanisms or other stationary or moving parts of the document scanner may be visible through the aperture 206 or pane 208, and can have a distinct visual pattern when imaged by imager 210. In either case, whether a back surface or other parts or assemblies, an image of the view through the aperture 206 or pane 208 will be referred to herein as the "background image", and references the expected image that is produced by scanning when there is no item 202 visible in the pane or aperture.

Various embodiments disclosed herein can detect these corrupted images as they are produced during the document scanning process. The system can automatically alert one or more users so that processing can be stopped, instances may be logged, and maintenance personnel can be notified. In other embodiments, the system can stop the processing automatically, log any necessary data, and notify maintenance personnel that maintenance is required.

Various embodiments can use one or both of two essential detection methods. A first method samples the line reflection across and beyond the surface of the mail item to detect distinctive features of this phenomenon that are consistent not only across the entire mail item, but beyond it; this indicates that the features are therefore not a graphical feature of the mail item itself. A second method is based on detecting patterns of unusually high ambiguity among character recognition results to detect blurring.

Figure 3:
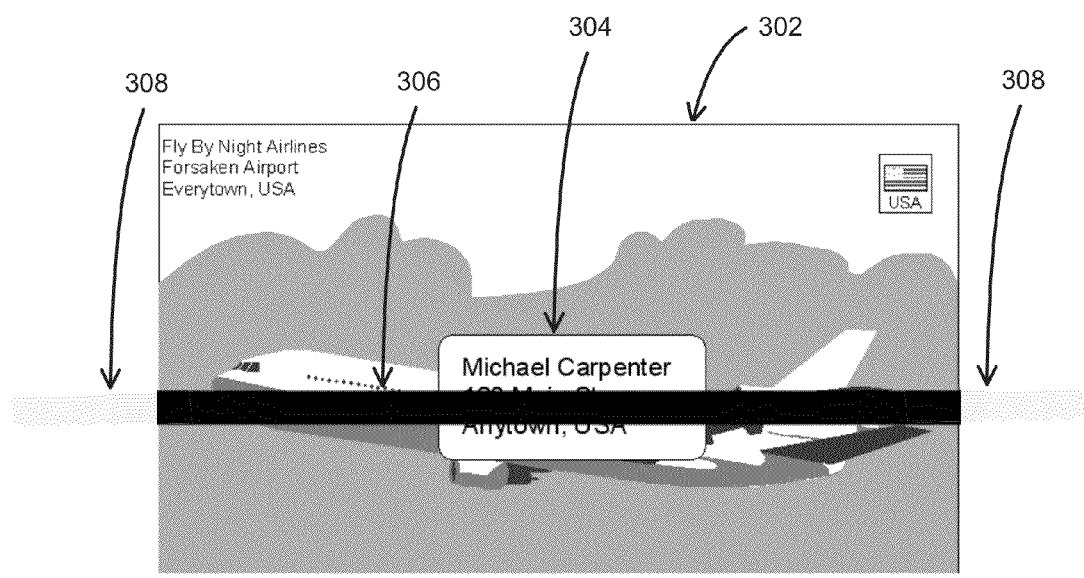
FIG. 3 illustrates a scanned image that exhibits a dark obstruction that can be detected according to disclosed embodiments.

Disclosed embodiments can detect a "dark obstruction" error in the image, which can be caused by material in the optical path that either absorbs rather than reflects light, or that blocks light from the illumination source from reaching the aperture. FIG. 3 illustrates a scanned image that exhibits a dark obstruction that can be detected according to disclosed embodiments. This figure shows a scanned image of a mailpiece 302 having an address label 304. The image also shows a dark obstruction 306 that extends across the mailpiece 302 and obscures some of label 304. Note that, because the dark obstruction is the result of an issue with the mail processing equipment, not the mailpiece itself, the dark obstruction in the image extends past the edges of mailpiece 302 at areas 308.

As with "bright obstructions", described below, the obstruction itself may be differentiated from an actual graphical feature on the mail item (such as a black horizontal stripe) in that the system can detect that the graphical feature is substantially or perfectly horizontal (or orthogonal to the direction that the mailpiece moves relative to the imager). Further, the system can detect that the graphical feature extends beyond the edge of the mail item in the image. The system can use this technique to determine that there is a dark obstruction in the document scanner, and so some maintenance should be performed.

Disclosed embodiments can detect a "bright obstruction" error in the image, which can be caused by buildup of dust on the pane in the aperture of the platen. A scanned image may exhibit this problem as lighter than normal streaks that are exactly horizontal on the image. The bright influence, which may have a translucent appearance, typically affects substantially or precisely the same pixels in the line across the entire image. Looking at image data just beyond the leading and trailing edge of the mail item, the bright effect is found to continue. The consistency of the effect beyond the edge of the mail item, coupled with the consistence of the effect in the pixels that make up the line is indicative of a feature that cannot be part of the mail, and which is therefore a detrimental maintenance condition (in this case, dust on the surface of the aperture glass).

Figure 4:
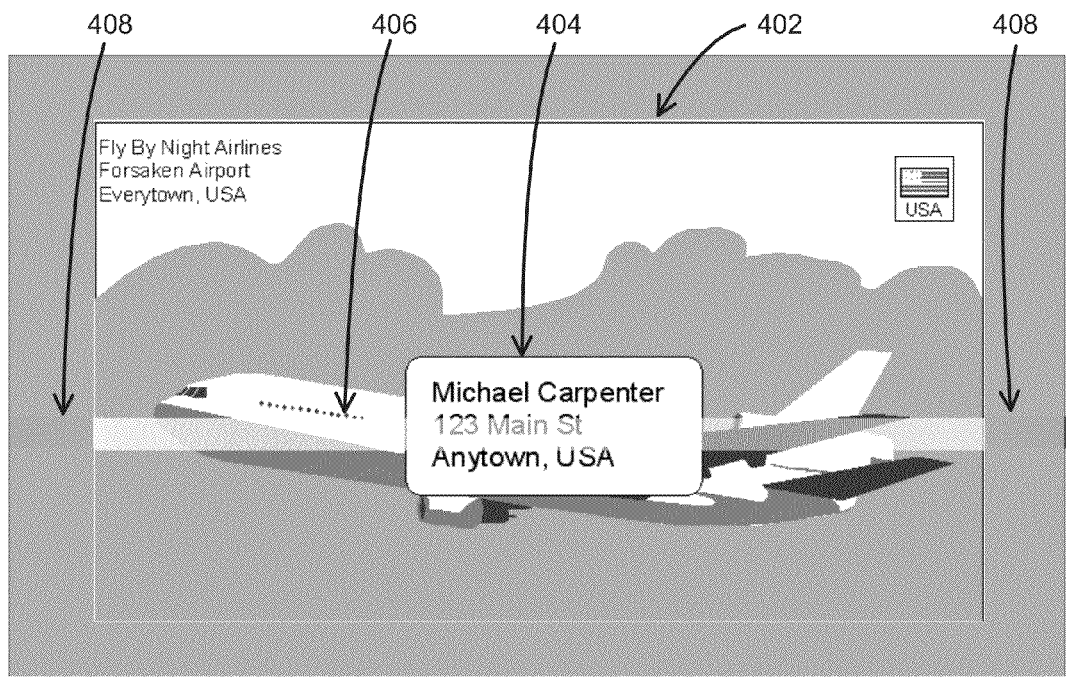
FIG. 4 illustrates a scanned image that exhibits a bright obstruction that can be detected according to disclosed embodiments.

FIG. 4 illustrates a scanned image that exhibits a bright obstruction that can be detected according to disclosed embodiments. This figure shows a scanned image of a mailpiece 402 having an address label 404; for clarity of illustrating the bright obstruction, this image is shown against a shaded background, and such a background may be naturally produced by the document scanner itself. The image also shows a bright obstruction 406 that extends across the mailpiece 402 and obscures some of label 404. Note that, because the bright obstruction is the result of an issue with the mail processing equipment, not the mailpiece itself, the bright obstruction in the image extends past the edges of mailpiece 402 at areas 408.

Figure 5:
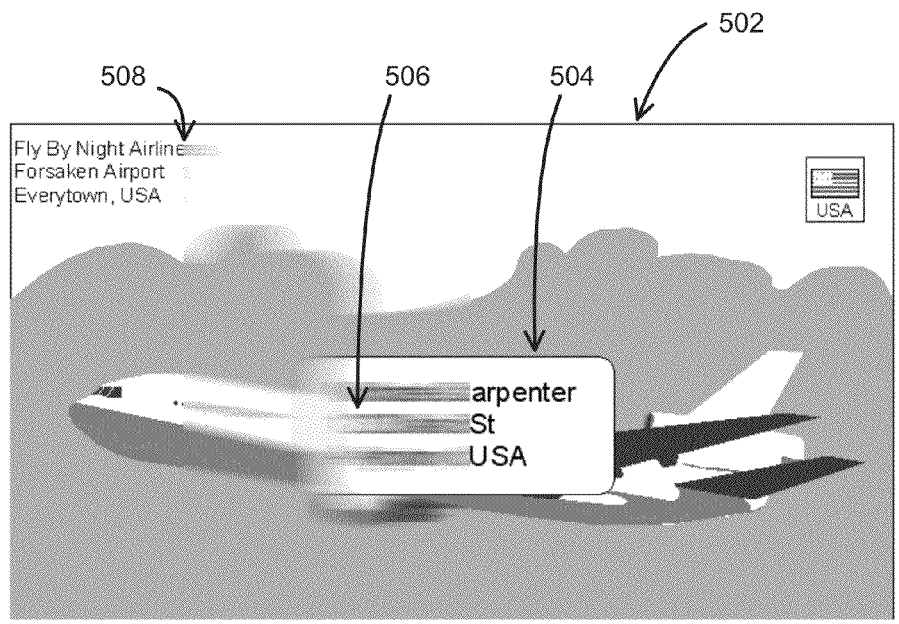
FIG. 5 illustrates a scanned image that exhibits a blur distortion that can be detected according to disclosed embodiments.

FIG. 5 illustrates a scanned image that exhibits a blur distortion that can be detected according to disclosed embodiments. This figure shows a scanned image of a mailpiece 502 having an address label 504. Note that some of the text and background image of the mailpiece is blurred or distorted, particularly portions of the destination address text 506 and the return address text 508.

"Blur Distortion" can be caused by the mail item changing speed during consistent scan rate process, because of acceleration or slipping, and causes significant reduction in optical character recognition (OCR) performance. OCR uses character confidence values from the core recognition function to classify individual text characters. Many OCRs generate alternative character results, along with confidence values for the alternatives. Through this approach, it is possible for the OCR to utilize multiple combinations of results to match actual addresses according to a database.

Since the field of text information on a mail item containing the delivery address, the "Address Block," typically uses consistent fonts and print quality, the confidence values for the character results typically show a relatively high confidence value, and a consistent difference between the first and second choices, depending on the actual similarity of the combination of graphemes that make up the two alternatives. For instance, a zero (0) and a capital "O" (O) are graphically quite similar, and would be expected to show minimal difference in confidence as a first and second choice from an OCR.

When an OCR processes blurred images, the characters cause the OCR to generate a range of character result alternatives that are graphically more different than is normally the case, all with relatively low confidence values. Since the blur effect represents a change in transport speed, it will be manifested in a perfectly vertical line. Therefore, the system can determine that areas on an image of a mail item that generate relatively low confidence results with a relatively large graphical variation of alternatives in perfectly vertical patterns may represent blurs (or other problems that also require maintenance attention). In many cases, blur effects can corrupt the image data to the extent that no OCR character results can be identified whatsoever. In these instance, address line structures will be longer than portions of the line with readable characters, and there will be a vertical boundary between readable and unreadable characters. Blur effects may also cause a combination of these two manifestations.

FIGS. 6A-6D illustrate techniques of detecting both bright and dark obstructions in accordance with disclosed embodiments. When a mail item is not present in the aperture, reflections to the sensor should be limited to the background image of features of the back surface or mechanisms associated with moving the mail item. The background image should remain relatively consistent according to the machine design, and should not be present in the image of the mail item. The consistent features of the background image may be learned such that they can be ignored in line scans between mail items. When such features are ignored, reflected or obstructed light between mail items is associated with an obstruction. There are numerous methods of detecting unusual patterns of reflected or obstructed light between mail items.

Figure 6A:
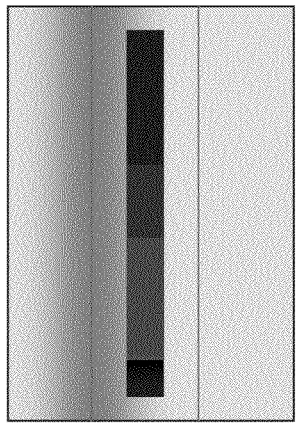
FIGS. 6A-6D illustrate techniques of detecting both bright and dark obstructions in accordance with disclosed embodiments.
Figure 6B:
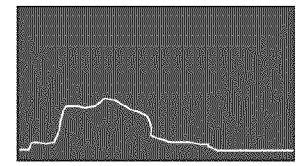

In some embodiments, the system can compare a reference waveform for reflected light on the sensor between mailpieces to a reference, and flag an error condition when deviation in that waveform exceeds a certain threshold. For example, assume that FIG. 6A represents a "normal" background image with no obstruction or other distortion, and FIG. 6B represent a waveform corresponding to that normal image. These can be produced and stored by the system as a reference image and a reference waveform.

Figure 6C:
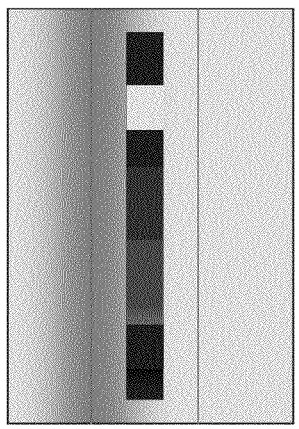
Figure 6D:
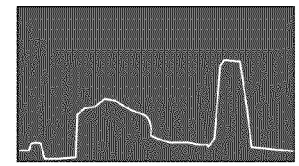

During operation, the system can regularly, periodically, or occasionally produce a current background image, such as that shown in FIG. 6C, and produce from it a corresponding current waveform as shown in FIG. 6D. Note in FIG. 6C the "bright distortion" illustrated by the white block in the current image, that would appear both in background images and in images of scanned items. The corresponding waveform in FIG. 6D reflects shows the differences caused by the bright distortion.

The system can compare the reference image and current image, and/or the reference waveform and current waveform. If there are substantial differences, these are identified by the system and the system can determine or identify, based on the comparison, a corresponding condition requiring maintenance.

Figure 7:
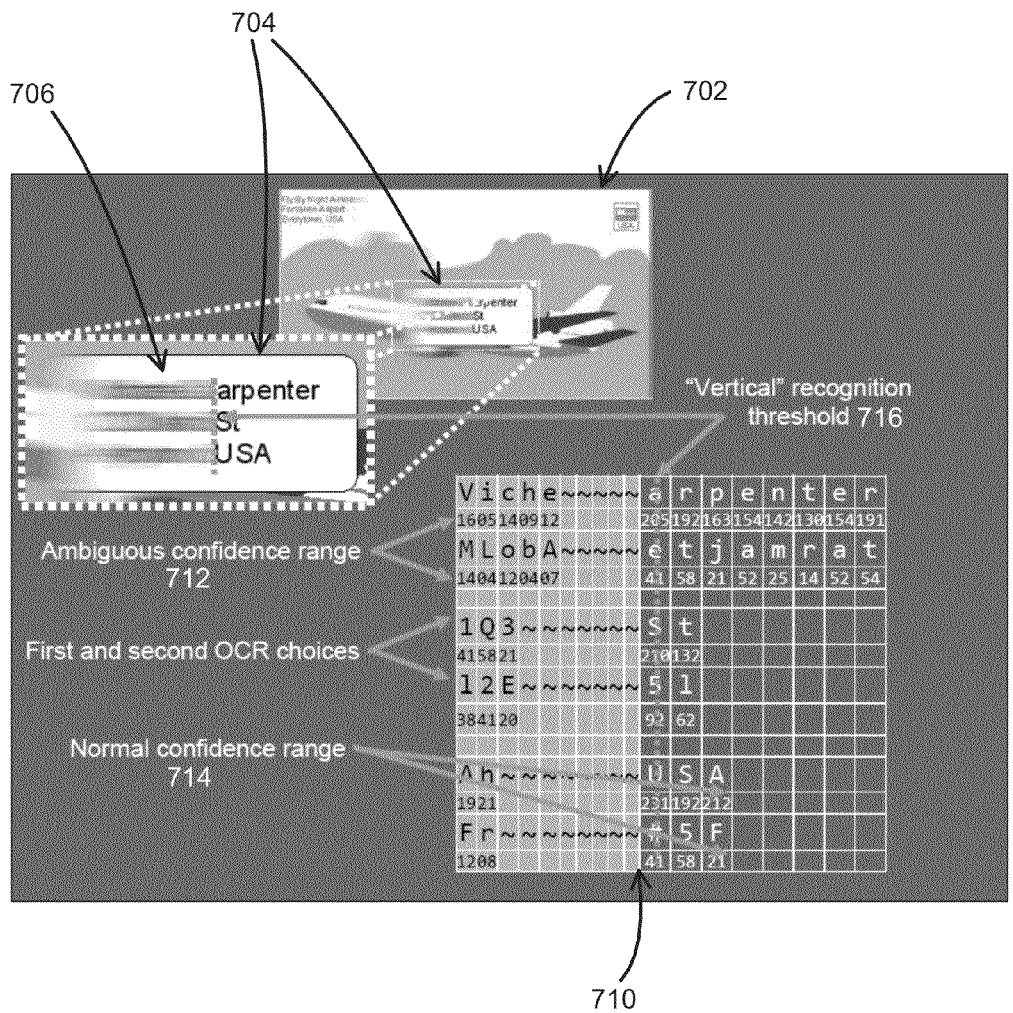
FIG. 7 illustrates a technique for detecting blur distortion in accordance with disclosed embodiments.

FIG. 7 illustrates a technique for detecting blur distortion in accordance with disclosed embodiments. Shown in this figure are an image of a mail item 702 having an address block 704 with an area 706 with blur distortion.

The system performs an optical character recognition (OCR) process on the address block using techniques known to those of skill in the art. This produces candidate results for each character in the address block, as shown in table 710. Each character is associated with a confidence values. In this example, the candidate results for the blurred area are low, in an ambiguous confidence range 712. Candidate results for the unblurred area are of a normal, high confidence range 714.

Note that the "boundary" between characters having an ambiguous confidence range and a normal confidence range is substantially vertically aligned, forming a vertical recognition threshold 716. The vertical recognition threshold acts as an indicator of a blurred distortion, since it shows the point at which the mail item was accelerated or moved so that the rest of the address block could not be correctly recognized, or could not be recognized with a high confidence.

Therefore, after the OCR process, the system identifies a vertical threshold between characters of the address block with an ambiguous confidence range and characters of the address block with a normal confidence range. Based on this identification, the system identifies a blurred distortion and a corresponding condition requiring maintenance.

Figure 8:
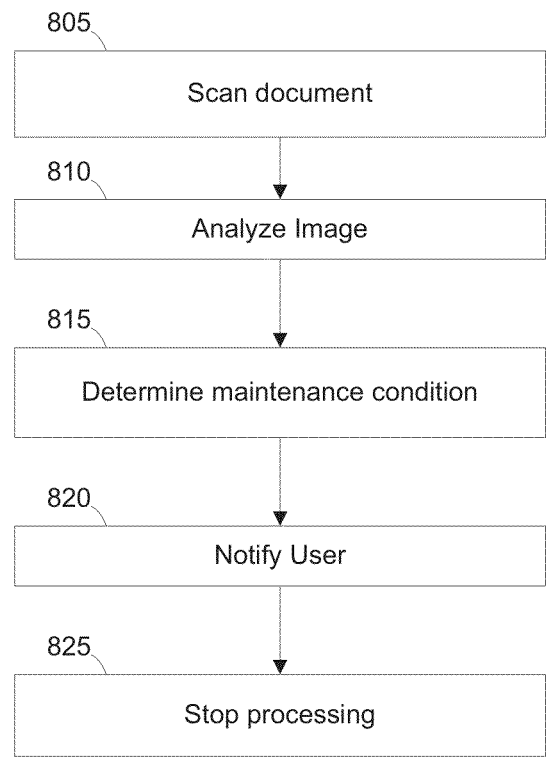
FIG. 8 depicts a process in accordance with disclosed embodiments.

FIG. 8 depicts a process in accordance with disclosed embodiments.

The system scans a document to produce a document image (step 805). In various embodiments, the system is a mail processing system such as a sorter or otherwise, can be a system as depicted in FIG. 1, and the document is a mail item such as a letter or otherwise. In various embodiments, the scan is performed as the document is transported past an imager that views the document through an aperture in a platen. In some embodiments, this step can include producing a current image of the background of the view through the aperture before or after the document is transported past the imager. The current image of the background can be part of the document image in some cases.

The system analyzes the document image (step 810). In various embodiments, this can include one or more of determining if there is a dark obstruction, determining if there is a light obstruction, and determining if there is a blurred distortion, each using techniques as described herein.

In some cases, this step includes comparing a reference image to the current image of the background, and determining, based on the comparison, that there is a dark obstruction or that there is a bright obstruction. In some cases, this step includes producing a current waveform corresponding to the current image of the background, comparing a reference waveform to the current waveform, and determining, based on the comparison, that there is a dark obstruction or that there is a bright obstruction.

In some cases, this step includes performing an OCR process on text in the document image, identifying a vertical recognition threshold based on the OCR process, and determining that the document image includes a blurred distortion based on the vertical recognition threshold.

Based on the analysis, the system determines that there is a condition of the system requiring maintenance (step 815). In various embodiments, the system determines that the document scanner requires maintenance in order to produce useful document images.

Based on the determination, the system can automatically notify at least one user of the condition requiring maintenance (step 820). This step can include displaying a notification on a display, activating a lamp, buzzer, or other audio or visual indicator, or otherwise.

Based on the determination, the system can automatically stop processing of at least some documents (step 825). This step can include, in various embodiments, stopping any further scanning of mail items or other documents, whether or not other processing is stopped.

In a typical case, at least the scanning is stopped until the condition that is causing the dark obstruction, light obstruction, blurred distortion, or other scanning error can be fixed by a user. The system can resume processing after the condition is fixed.

In various embodiments, various steps and procedures of the processes described herein can be omitted, repeated, combined, performed concurrently, sequentially, or in a different order, unless specifically described otherwise in the claims appended hereto.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually early out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a data processing system, comprising:
    scanning a document to produce a document image;
    analyzing the document image, wherein analyzing the document image includes one or more of determining if there is a dark obstruction in the document image and determining if there is a bright obstruction in the document image;
    based on the analysis, determining that there is a condition of the data processing system that requires maintenance and that produced the dark obstruction or the bright obstruction; and
    notifying at least one user of the condition of the data processing system that requires maintenance and stopping scanning additional documents so that the user can correct the condition of the data processing system that requires maintenance.

2. The method of claim 1, further comprising stopping processing of at least some other documents based on the determination that the data processing system requires maintenance.

3. The method of claim 1, wherein the data processing system is a mail processing system and the document is a mail item.

4. The method of claim 1, wherein analyzing the document image includes determining if there is a blurred distortion in the document image.

5. The method of claim 1, wherein scanning the document is performed as the document is transported past an imager that views the document through an aperture in a platen, and includes producing a current image of a background of the view through the aperture before or after the document is transported past the imager, and wherein the current image of the background is part of the document image.

6. The method of claim 5, wherein analyzing the document includes comparing a reference image to the current image of the background to determine, based on the comparison, that there is the dark obstruction in the document image or that there is the bright obstruction in the document image.

7. The method of claim 5, wherein analyzing the document includes producing a current waveform corresponding to the current image of the background, comparing a reference waveform to the current waveform to determine, based on the comparison, that there is the dark obstruction in the document image or that there is the bright obstruction in the document image.

8. The method of claim 1, wherein analyzing the document includes performing an OCR process on text in the document image, identifying a vertical recognition threshold based on the OCR process, and determining that the document image includes a blurred distortion based on the vertical recognition threshold.

9. The method of claim 1, wherein determining that there is a condition of the data processing system that requires maintenance includes determining that a document scanner requires maintenance in order to produce useful document images.

10. The method of claim 1, wherein the condition of the data processing system that requires maintenance includes a change in a speed of transport of the document by the data processing system.

11. The method of claim 1, wherein notifying at least one user of the condition that requires maintenance includes at least one of displaying a notification on a display, activating an audio, and activating a visual indicator.

12. A mail processing system, comprising:
    a platen having an aperture; and
    an imager configured to scan a document as the document is transported past the aperture; wherein the mail processing system is configured to
    scan the document to produce a document image;
    analyze the document image, wherein analyzing the document image includes one or more of determining if there is a dark obstruction in the document image and determining if there is a bright obstruction in the document image;
    based on the analysis, determine that there is a condition of the mail processing system that requires maintenance and that produced the dark obstruction or the bright obstruction; and
    notify at least one user of the condition of the mail processing system that requires maintenance and stop scanning additional documents so that the user can correct the condition of the mail processing system that requires maintenance.

13. The mail processing system of claim 12, wherein the mail processing system also stops processing of at least some other documents based on the determination.

14. The mail processing system of claim 12, wherein analyzing the document image includes determining if there is a blurred distortion in the document image.

15. The mail processing system of claim 12, wherein scanning the document includes producing a current image of a background of the view through the aperture before or after the document is transported past the aperture, and wherein the current image of the background is part of the document image.

16. The mail processing system of claim 15, wherein analyzing the document includes comparing a reference image to the current image of the background to determine, based on the comparison, that there is the dark obstruction in the document image or that there is the bright obstruction in the document image.

17. The mail processing system of claim 15, wherein analyzing the document includes producing a current waveform corresponding to the current image of the background, comparing a reference waveform to the current waveform to determine, based on the comparison, that there is the dark obstruction in the document image or that there is the bright obstruction in the document image.

18. The mail processing system of claim 12, wherein analyzing the document includes performing an OCR process on text in the document image, identifying a vertical recognition threshold based on the OCR process, and determining that the document image includes a blurred distortion based on the vertical recognition threshold.

19. The mail processing system of claim 12, wherein notifying at least one user of the condition that requires maintenance includes at least one of displaying a notification on a display, activating an audio, and activating a visual indicator.

20. A non-transitory computer readable medium having program instructions tangibly stored thereon executable by a processor to perform a method comprising:
   scanning a document using a document scanner to produce a document image;
   analyzing the document image, wherein analyzing the document image includes one or more of determining if there is a dark obstruction in the document image and determining if there is a bright obstruction in the document image
   determining, based on the analysis of the document image that there is a condition of the document scanner that requires maintenance and that produced the dark obstruction or the bright obstruction; and
   notifying a user of the condition of the document scanner that requires maintenance and stopping scanning additional documents so that the user can correct the condition of the document scanner that requires maintenance.

* * * * *